(12) United States Patent
Nayeb Nazar et al.

(10) Patent No.: US 12,262,383 B2
(45) Date of Patent: Mar. 25, 2025

(54) CONTROL CHANNEL FOR NEW RADIO

(71) Applicant: InterDigital Patent Holdings, Inc., Wilmington, DE (US)

(72) Inventors: Shahrokh Nayeb Nazar, San Diego, CA (US); Oghenekome Oteri, San Diego, CA (US); Mahmoud Taherzadeh Boroujeni, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/572,290

(22) Filed: Jan. 10, 2022

(65) Prior Publication Data

US 2022/0132497 A1   Apr. 28, 2022

Related U.S. Application Data

(63) Continuation of application No. 16/337,231, filed as application No. PCT/US2017/054020 on Sep. 28, 2017, now Pat. No. 11,224,033.
(Continued)

(51) Int. Cl.
*H04W 72/04* (2023.01)
*H04L 1/00* (2006.01)
(Continued)

(52) U.S. Cl.
CPC .............. *H04W 72/21* (2023.01); *H04L 1/00* (2013.01); *H04L 5/0055* (2013.01); *H04W 4/70* (2018.02); *H04L 5/0007* (2013.01)

(58) Field of Classification Search
CPC ........ A24F 40/10; A24F 40/465; A24F 40/50; A24F 40/51; A24F 40/53; A24F 40/60;
(Continued)

(56) References Cited

U.S. PATENT DOCUMENTS 8,553,671 B2   10/2013  Kim et al.
10,568,071 B2 *  2/2020  Park ...................... H04L 1/1861
(Continued)

FOREIGN PATENT DOCUMENTS

CN     102484869 A    5/2012
CN     102577209 A    7/2012
(Continued)

OTHER PUBLICATIONS

Interdigital Communications, "Unified control channel design for NR", 3GPP Tdoc R1-1609912; 3GPP TSG RAN WG1 Meeting #86bis; Lisbon, Portugal, Oct. 10-14, 2016, 3 pages.
(Continued)

*Primary Examiner* — Phuc H Tran
(74) *Attorney, Agent, or Firm* — Flaster Greenberg, P.C.

(57) ABSTRACT

Systems, methods, and instrumentalities are described herein that may be used to determine one or more control channel operational parameters associated with transmitting first uplink control information (UCI) and second UCI in a same control channel. The parameters may include respective repetition factors and/or spreading factors associated with the first UCI and the second UCI. The parameters may be determined based on respective characteristics of the first UCI and the second UCI. These characteristics may include reliability requirements, usage scenarios, and/or the like. Self-contained subframes may be employed to transmit data and/or control information. The control information may be transmitted using different numerologies than the data.

20 Claims, 14 Drawing Sheets

Related U.S. Application Data

(60) Provisional application No. 62/401,057, filed on Sep. 28, 2016.

(51) Int. Cl.
*H04L 5/00* (2006.01)
*H04W 4/70* (2018.01)
*H04W 72/21* (2023.01)

(58) Field of Classification Search
CPC .. A24F 47/00; H01M 10/48; G01R 19/16576; G01R 31/382; H02J 7/00; H02J 7/0063; H02M 3/158; H04L 1/00; H04L 5/0007; H04L 5/0055; H04W 4/70; H04W 72/21; H05B 1/02; H05B 6/02
See application file for complete search history.

(56) References Cited

U.S. PATENT DOCUMENTS

| | | |
|---|---|---|
| 2010/0098012 A1 | 4/2010 | Shin et al. |
| 2010/0177688 A1* | 7/2010 | Kishiyama ............ H04L 5/0048 370/328 |
| 2010/0271970 A1 | 10/2010 | Pan et al. |
| 2011/0141928 A1 | 6/2011 | Shin et al. |
| 2011/0243066 A1 | 10/2011 | Nayeb Nazar et al. |
| 2011/0299484 A1 | 12/2011 | Nam et al. |
| 2012/0320951 A1 | 12/2012 | Han et al. |
| 2013/0153298 A1 | 6/2013 | Li et al. |
| 2014/0219210 A1 | 8/2014 | Lunttila et al. |
| 2014/0362701 A1 | 12/2014 | Roh et al. |
| 2014/0369390 A1 | 12/2014 | Pourahmadi et al. |
| 2015/0282167 A1* | 10/2015 | Lahetkangas ......... H04L 5/0044 370/329 |
| 2016/0094996 A1 | 3/2016 | Xiong et al. |
| 2016/0192388 A1 | 6/2016 | Ekpenyong et al. |
| 2017/0111894 A1* | 4/2017 | Chen ..................... H04L 5/0048 |
| 2017/0230962 A1* | 8/2017 | Park ....................... H04L 1/1861 |
| 2018/0019843 A1 | 1/2018 | Papasakellariou et al. |
| 2018/0131482 A1* | 5/2018 | Zhou ................. H04L 27/26025 |
| 2018/0206226 A1 | 7/2018 | Zeng et al. |
| 2019/0215812 A1* | 7/2019 | Lyu ...................... H04W 72/044 |
| 2020/0008231 A1 | 1/2020 | Vilaipornsawai et al. |
| 2020/0044800 A1 | 2/2020 | Takeda et al. |
| 2020/0053761 A1 | 2/2020 | Hosseini et al. |

FOREIGN PATENT DOCUMENTS

| | | |
|---|---|---|
| CN | 104168098 A | 11/2014 |
| CN | 104868986 A | 8/2015 |
| EP | 3214869 A1 | 6/2018 |
| IN | 201637019361 A | 8/2016 |
| WO | 2016068072 A1 | 5/2016 |

OTHER PUBLICATIONS

Nokia et al., "Adaptive-length redundancy matching for HARQ transmission", 3GPP Tdoc R1-167300; 3GPP TSG-RAN WG1 #86; Gothenburg, Sweden, Aug. 22-26, 2016, 5 pages.
Ericsson, "UCI on sPUSCH with short TTI", 3GPP Tdoc R1-167492; 3GPP TSG-RAN WG1 #86; Goteborg, Sweden, Aug. 22-26, 2016, 4 pages.
RP-160183, "Status report for WI: Narrow Band IoT", RAN1 3GPP tsg_ran\TSG_RAN, TSGR_71, Mar. 1, 2016.

* cited by examiner

CONTROL CHANNEL FOR NEW RADIO

CROSS-REFERENCE TO RELATED APPLICATIONS

This application is a continuation application of U.S. application Ser. No. 16/337,231, filed on Mar. 27, 2019, which is a national stage application under 35 U.S.C. § 371 of International Application No. PCT/US2017/054020, filed Sep. 28, 2017, which claims the benefit of U.S. Provisional Patent Application No. 62/401,057, filed on Sep. 28, 2016, the disclosure of which is incorporated in its entirety herein, for all purposes.

BACKGROUND

New Radio (NR) technologies (e.g., in 5G wireless systems) may include different usage scenarios. These different usage scenarios may imply different latency, reliability, coverage, and/or capacity requirements (e.g., for the control channel). Control channel design may be adapted to meet different requirements of the new radio technologies including, for example, enhanced mobile broadband (eMBB), massive machine-type communications (mMTC), and Ultra-Reliable and Low Latency Communications (URLLC).

SUMMARY

Systems, methods, and instrumentalities are described herein that may be used to determine a first repetition factor for transmitting first uplink control information (UCI) in an uplink control channel and a second repetition factor for transmitting second UCI in the uplink control channel. The first repetition factor may be determined based on a characteristic associated with the first UCI. The second repetition factor may be determined based on a characteristic associated with the second UCI. The respective characteristics of the first UCI and the second UCI may be different from each other, resulting in the second repetition factor being different from the first repetition factor. Once the first and the second repetition factors are determined, the first UCI may be transmitted using the first repetition factor in the uplink control channel and the second UCI may be transmitted using the second repetition factor in the same uplink control channel.

In examples, the characteristic associated with the first UCI may include at least one of a first reliability requirement, a first latency requirement, or a first payload size associated with the first UCI. The characteristic associated with the second UCI may include at least one of a second reliability requirement, a second latency requirement, or a second payload size associated with the second UCI. In examples, the characteristic associated with the first UCI may include a first beamforming mode used to precode the first UCI, and the characteristic associated with the second UCI may include a second beamforming mode used to precode the second UCI.

In examples, the characteristic associated with the first UCI may include a first usage scenario associated with the first UCI and the characteristic associated with the second UCI may include a second usage scenario associated with the second UCI. Each of the first usage scenario and the second usage scenario may be associated with one of Ultra-Reliable and Low Latency Communications (UR-LLC), Enhanced Mobile Broadband (eMBB), or Massive Machine-Type Communications (mMTC). When the first usage scenario is associated with a higher reliability requirement than the second usage scenario, the first repetition factor may be greater than the second repetition factor. When the first usage scenario is associated with UR-LLC and the second usage scenario is associated with eMBB or mMTC, at least a part of the first UCI, at least a part of the second UCI, and a reference signal may be multiplexed in an orthogonal frequency-division multiplexing (OFDM) symbol. The OFDM symbol may include multiple resource elements. The reference signal, the part of the first UCI, and the part of the second UCI may be mapped to respective first, second and third subsets of resource elements of the OFDM symbol. In such a scenario, the second subset of resource elements may be closer to the first subset of resource elements than the third subset of resource elements is to the first subset of resource elements.

The systems, methods, and instrumentalities described herein may be further associated with determining, based on the characteristic associated with the first UCI, a first spreading factor for transmitting the first UCI in the uplink control channel and determining, based on the characteristic associated with the second UCI, a second spreading factor for transmitting the second UCI in the uplink control channel. The second spreading factor may be different from the first spreading factor when the respective characteristics associated with the first UCI and the second UCI are different from each other. Once determined, the first spreading factor may be used to transmit the first UCI in the uplink control channel, and the second spreading factor may be used to transmit the second UCI in the uplink control channel.

BRIEF DESCRIPTION OF THE DRAWINGS

A more detailed understanding may be had from the following description, given by way of example in conjunction with the accompanying drawings wherein.

DETAILED DESCRIPTION

Figure 1A:
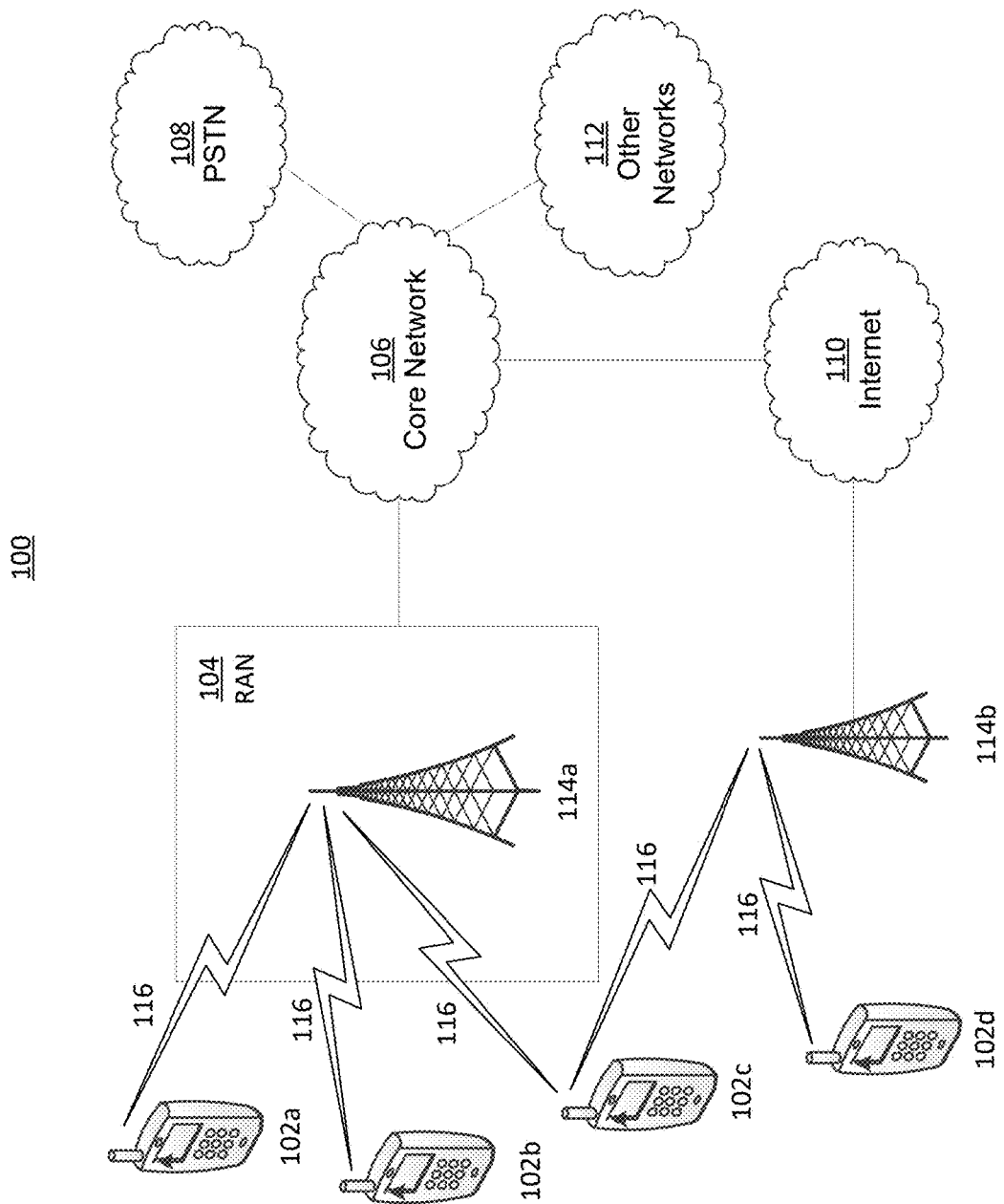
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
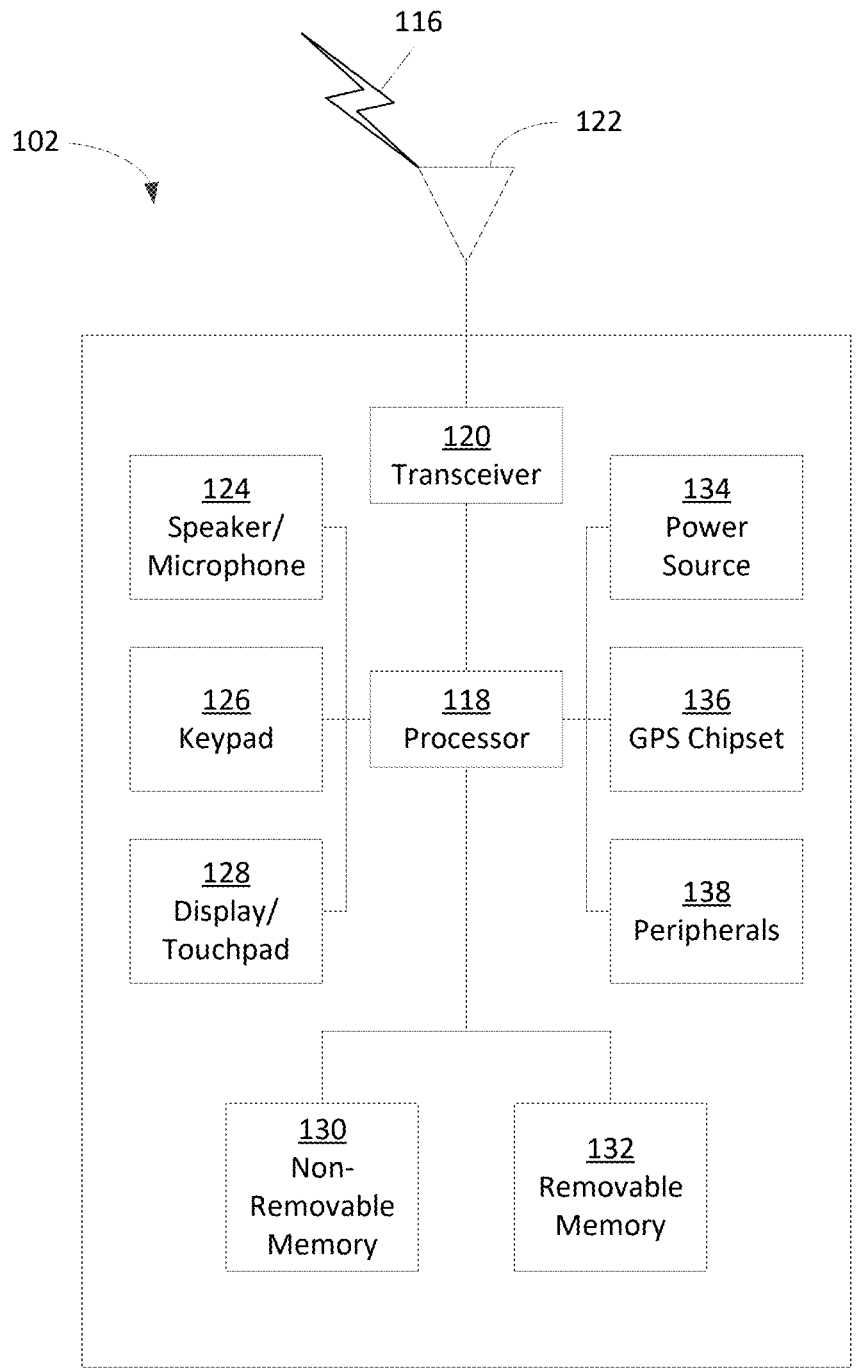
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
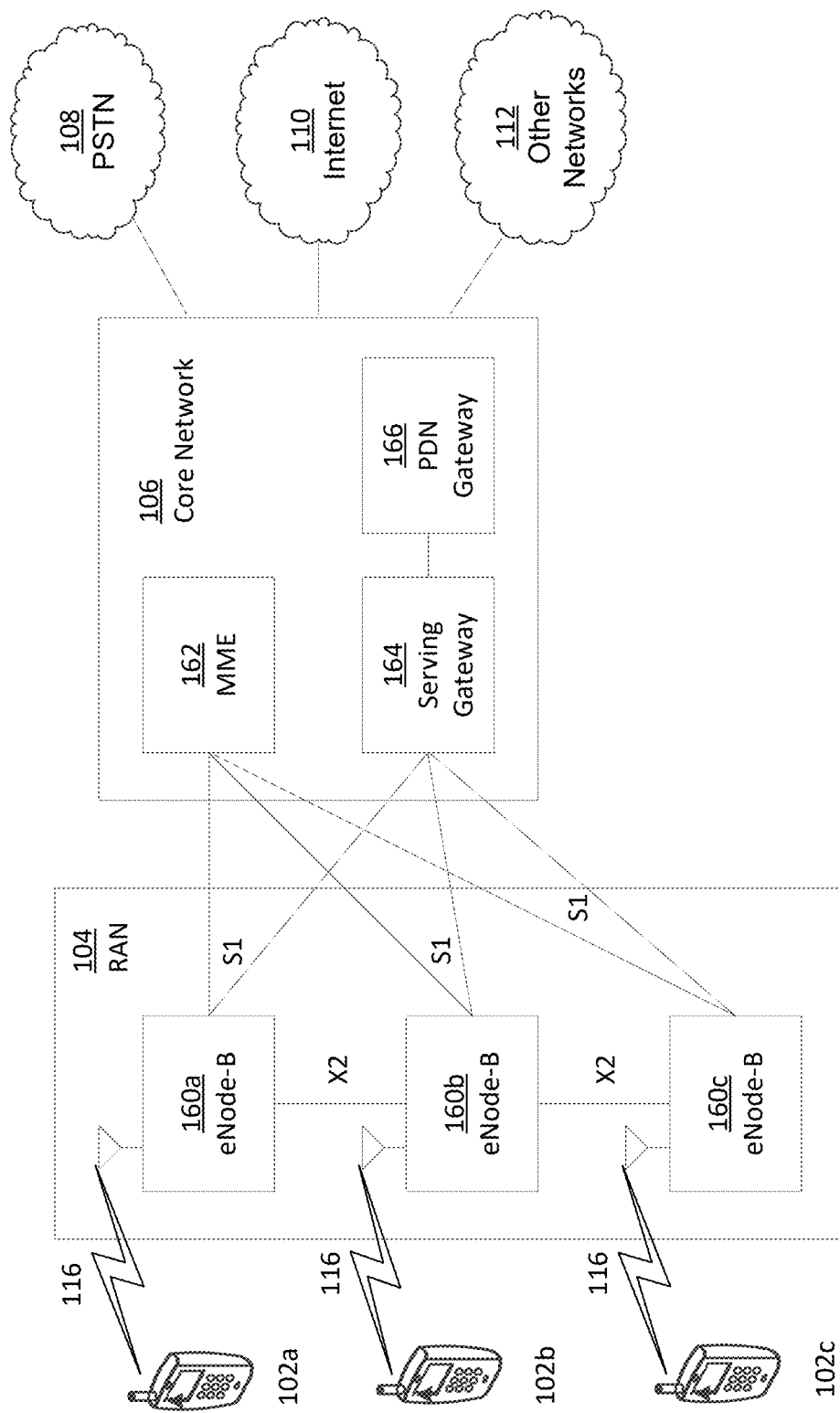
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
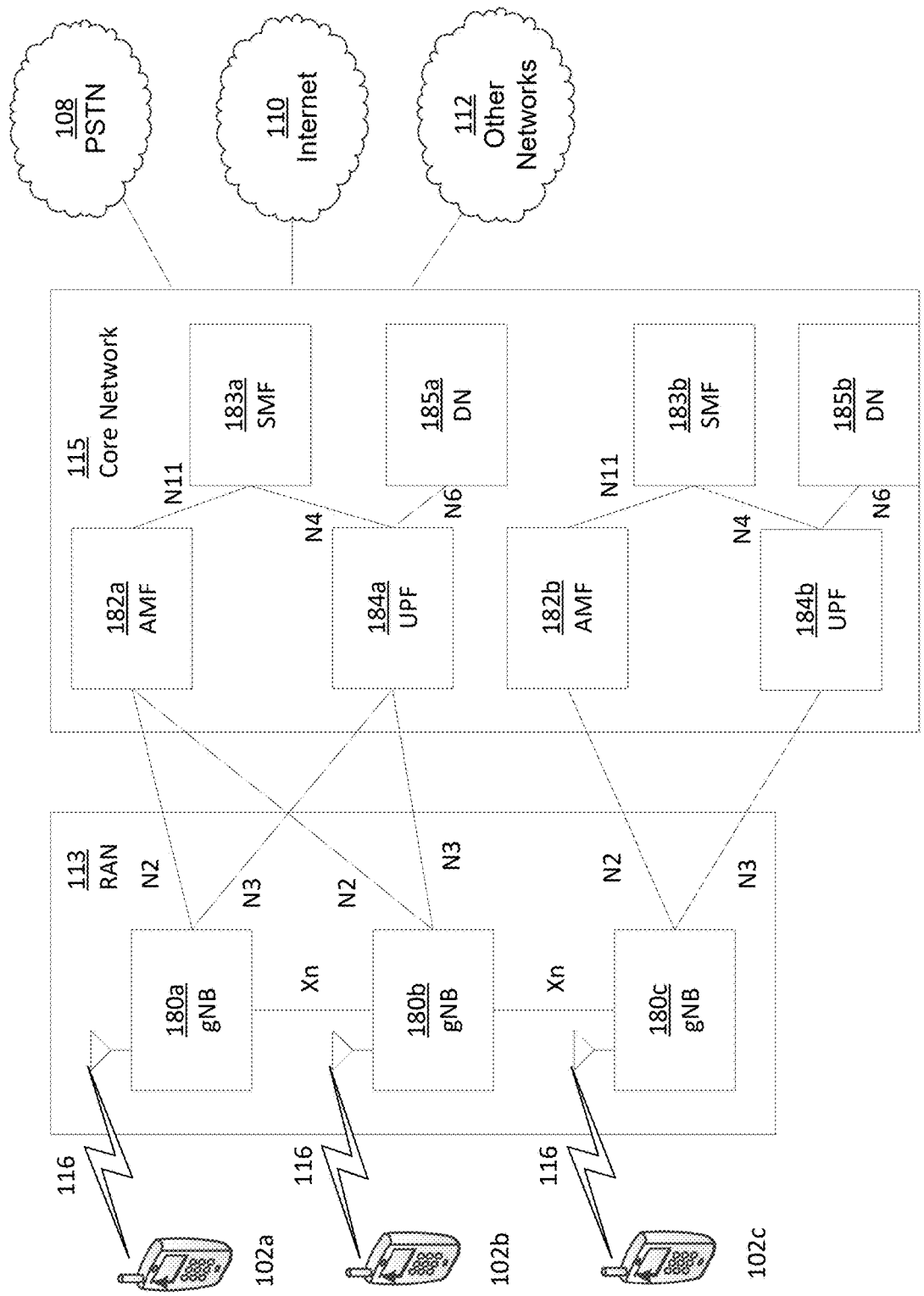
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Cyclic prefix orthogonal frequency-division multiplexing (CP-OFDM) may be used (e.g., in NR) for DL and UL (e.g., for up to 40 GHz for eMBB and URLLC). Control channel design may be unified across DL and UL. A signal structure may be provided for control channels that may enhance the commonality between UL and DL. The unified control channel design approach may enhance the efficiency of DL and UL control channel multiplexing (e.g., in self-contained subframes). The unified control channel design approach may simplify WTRU-to-WTRU sidelink transceiver design. The unified control channel design approach may facilitate reciprocity-based communication techniques (e.g., such as techniques that may utilize commonality between UL and DL. The unified control channel design approach may reduce standardization efforts.

In new radio, a diverse set of applications may be supported. A flexible control signalling design supporting a scalable payload may be implemented (e.g., for forward compatibility). The flexible control channel design approach may avoid design fragmentation (e.g., since dedicated time-frequency resources may no longer be needed for each control channel format).

A physical downlink control channel (PDCCH) (e.g., such as in LTE) may use the first three or four OFDM symbols in an LTE subframe. This design may lead to limited capacity, lack of support for inter-cell interference cancellation (ICIC) and/or for coordinated multi-point transmission/reception (CoMP), large overhead (e.g., each OFDM symbol may add approximately 7% overhead), limited payload size, and/or low user throughput (e.g., due to high blocking probability).

An Enhanced Physical downlink control channel (EDPCCH) (e.g., such as in LTE Advanced) may divide resources between data and control (e.g., using frequency division duplexing (FDD)). In frequency tones assigned for the control channel, EDPCCH may cover a whole subframe (e.g., instead of the beginning three or four OFDM symbols).

The utilization of FDD in EPDCCH may lead to higher and/or scalable capacity, support of frequency-domain inter-cell interference coordination, improved spatial reuse (e.g., MIMO), support of beamforming and diversity, support of frequency-selective scheduling, and/or coexistence on the same carrier as legacy wireless transmit/receive unit (WTRU).

For URLLC, the reliability of a control channel may be increased (e.g., to be in line with URLLC's low-error-rate requirements). There may be stringent requirements with respect to delay. For mMTC, reliability requirements (e.g., for a control channel) may be relaxed. For mMTC serving a large number of users, the size of a control channel region may increase and the probability of blockage may increase. For eMBB, new radio may be extended to higher bands, which may have implications on control channel design. In the presence of more attenuation in higher bands, signal-to-noise ratio (SNR) may be improved by beamforming. Antenna ports at transmission/reception point (TRPs) may be utilized for better beamforming.

A reference symbol (e.g., such as a complex number) may be used as a pilot. A reference symbol may be fixed and/or known. A reference signal may denote a time domain signal that may be generated after processing one or more reference symbols. For example, in OFDM, reference symbols may be used to represent the complex numbers that are fed into an inverse discrete fourier transform (IDFT) block while reference signals may be used to represent the output of the IDFT block.

A unified control channel design may be applied to the uplink (UL) and downlink (DL) of a wireless communication system. Such a unified design may be suitable, for example when CP-OFDM is employed as the waveform for both the UL and the DL (e.g., for frequencies less than 40 GHz).

Figure 2:
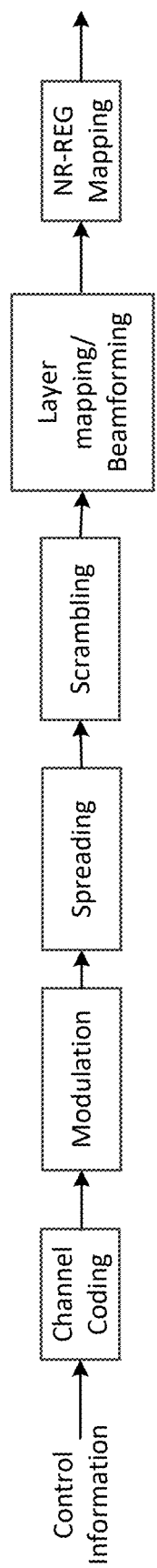
FIG. 2 is a diagram illustrating an example control channel construction process.

A unified control channel design may reduce complexity. Using such a design, a base station and a WTRU may use a similar transceiver structure. FIG. 2 shows an example control channel construction process that may include channel coding, modulation, spreading, scrambling, layer mapping and/or beamforming, and/or new radio resource element group (NR-REG) mapping.

Flexible control channel multiplexing may be applied to self-contained time slots such as self-contained subframes. With self-contained time slots (e.g., subframes), a transmission (e.g., a data transmission) and/or an acknowledgement transaction may be completed in one time slot (e.g., one subframe, one TTI, etc.). A self-contained time slot such as a self-contained subframe may include one or more reference signals, control channel information, data, and/or the like. In examples, the one or more reference signals and/or control channel information may be transmitted ahead the data within the self-contained time slot. By using self-contained subframes, latency may be reduced (e.g., to a fraction of the subframe length).

Figure 3:
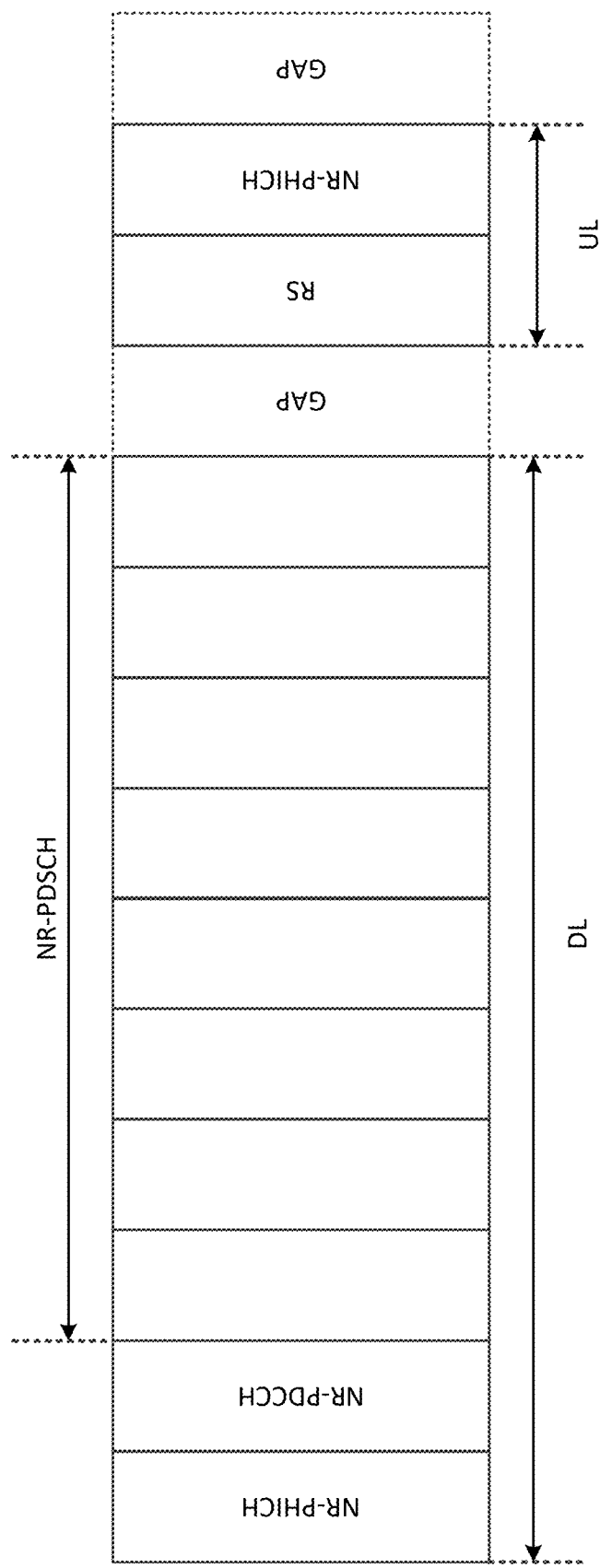
FIG. 3 is a diagram illustrating a first example self-contained subframe.

FIG. 3 shows an example self-contained subframe (e.g., which may be used in the downlink and/or the uplink). The example subframe may include multiple symbols (e.g., CP-OFDM symbols). The subframe may be used to carry DL and UL information. For instance, a first new radio physical hybrid automatic repeat request (HARQ) indicator channel (NR-PHICH) may be transmitted in a first symbol of the subframe (e.g., towards the beginning of the subframe) and may carry an ACK/NACK response that corresponds to a new radio physical uplink shared channel (NR-PUSCH) transmission from a previous subframe. A first NR-PDCCH carrying control information may be transmitted in a second symbol of the subframe. A second NR-PHICH may be transmitted in a third symbol of the subframe (e.g., towards the end of the subframe), which may carry an ACK/NACK response that corresponds to a NR- PUSCH transmission in the current subframe. The subframe may also include one or more reference signal symbols, and/or one or more gaps. The one or more gaps may be budgeted (e.g., reserved) between the DL and UL to satisfy timing requirements at a WTRU or a base station (e.g., to provide enough time for processing). Each gap may be equal to approximately one OFDM symbol duration.

Figure 4:
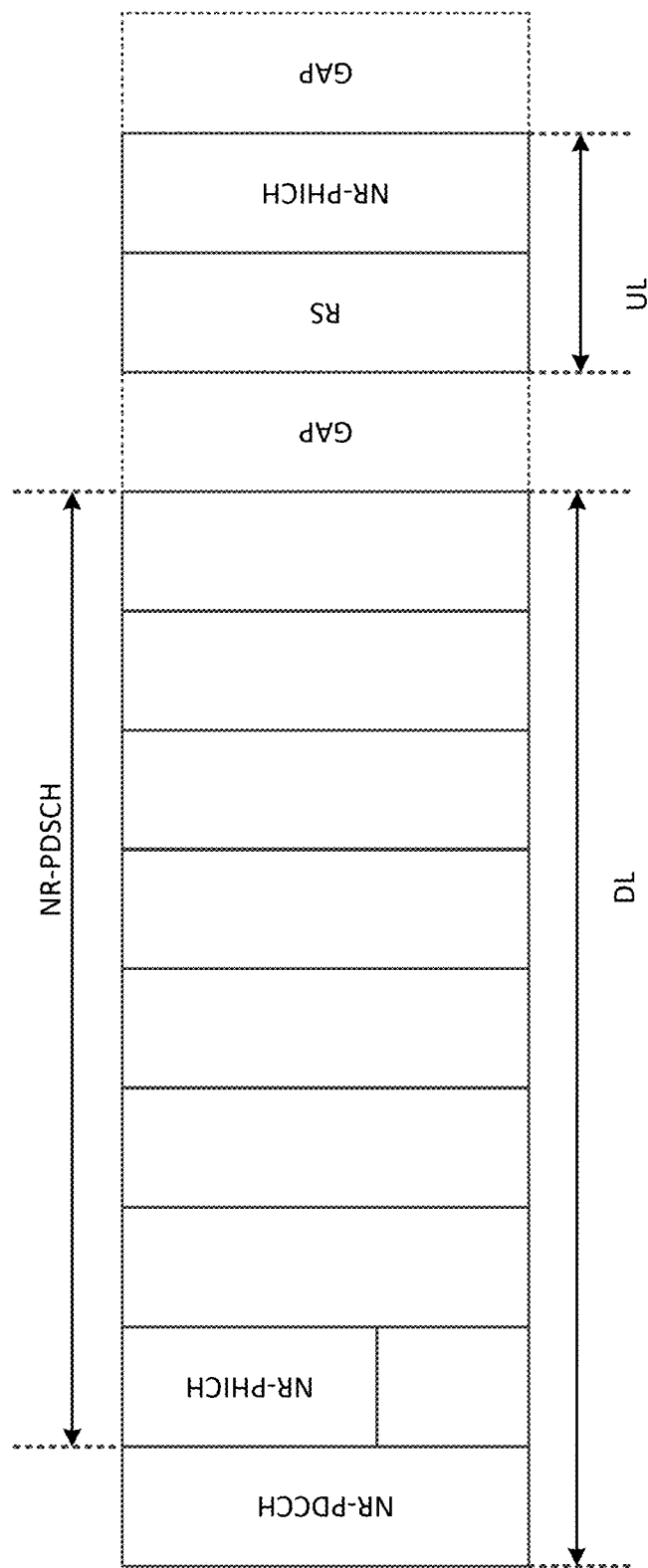
FIG. 4 is a diagram illustrating a second example self-contained subframe.

FIG. 4 shows another example self-contained subframe that may support various usage scenarios (e.g., potentially all usage scenarios).

A control channel (e.g., a NR-PHICH and/or a NR-PDCCH) may be direction agnostic and may be transmitted in the uplink and/or the downlink. A unified and/or flexible design (e.g., for control channel structure, subframe structure, etc.) may be adopted for the downlink and the uplink. A unified and/or flexible design may span the entire transmission bandwidth or a section of the entire transmission bandwidth, for example. A unified and/or flexible design may allow frequency division multiplexing of data and/or control channel. For example, a flexible subframe design may allow time and/or frequency division multiplexing of control, data and/or reference symbols or signals.

FIG. 4 shows another example self-contained subframe that may support various usage scenarios.

For new radio, a control channel (e.g., a NR-PHICH) may be designed to carry HARQ ACK/NACK. The HARQ ACK/NACK may be in response to UL NR-PUSCH transmissions, or DL new radio physical downlink shared channel (PDSCH) transmissions. In the former example case, the ACK/NACK may be transmitted in DL to support UL HARQ operation. In the latter case, the ACK/NACK may be transmitted in UL to support DL HARQ operation. In an example embodiment, a successful transmission may be associated with a positive acknowledgment (ACK) (e.g., encoded as a binary "1"). A non-successful transmission may be associated with a negative ACK (NACK) (e.g., encoded as a binary "0"). As shown above, an example mapping of an NR-PHICH in a 14-symbol self-contained subframe may be shown in FIG. 3. A gap (e.g., equal to approximately one OFDM symbol duration) may be budgeted (e.g., reserved) between the DL and UL, or between the UL and DL, to satisfy timing requirements at a WTRU or base station (e.g., to provide enough time for required processing time).

Example control information may be illustrated by the following. A control channel (e.g., a NR-PHICH) may carry a HARQ ACK/NACK response corresponding to a PDSCH or PUSCH transmission. The HARQ ACK/NACK response may be sent in the same subframe in which the PDSCH or PUSCH transmission was sent (e.g., for self-contained subframes), or the HARQ ACK/NACK response may be sent in a different subframe (e.g., for non-self-contained subframes). For example, in FIG. 3, the NR-PHICH transmitted in a first symbol (e.g., an OFDM symbol) of the DL may carry an ACK/NACK response that corresponds to a NR-PUSCH transmission from a previous subframe. The NR-PHICH transmitted on a second symbol (e.g., an OFDM symbol) of the UL may carry an ACK/NACK response that corresponds to a NR-PDSCH transmission in the current subframe. Note that the NR-PHICH transmitted in the UL is used herein merely as an example. The techniques described herein may be applied to other control channels as well, and NR-PHICH may be interchangeably referred to herein as new radio physical uplink control channel (NR-PUCCH).

The NR-PHICH described herein may be used (e.g., by a WTRU) to transmit information (e.g., any control information) in addition to or in lieu of HARQ ACK/NACK. For example, the NR-PHICH may be used to transmit a scheduling request (SR) in the UL. The scheduling request may include one or more bits of information. In an example (e.g., in a beam-based design), a WTRU (e.g., each WTRU) may send keep-alive or polling information to a TRP so that the TRP may know whether to keep sweeping a specific beam.

Figure 5:
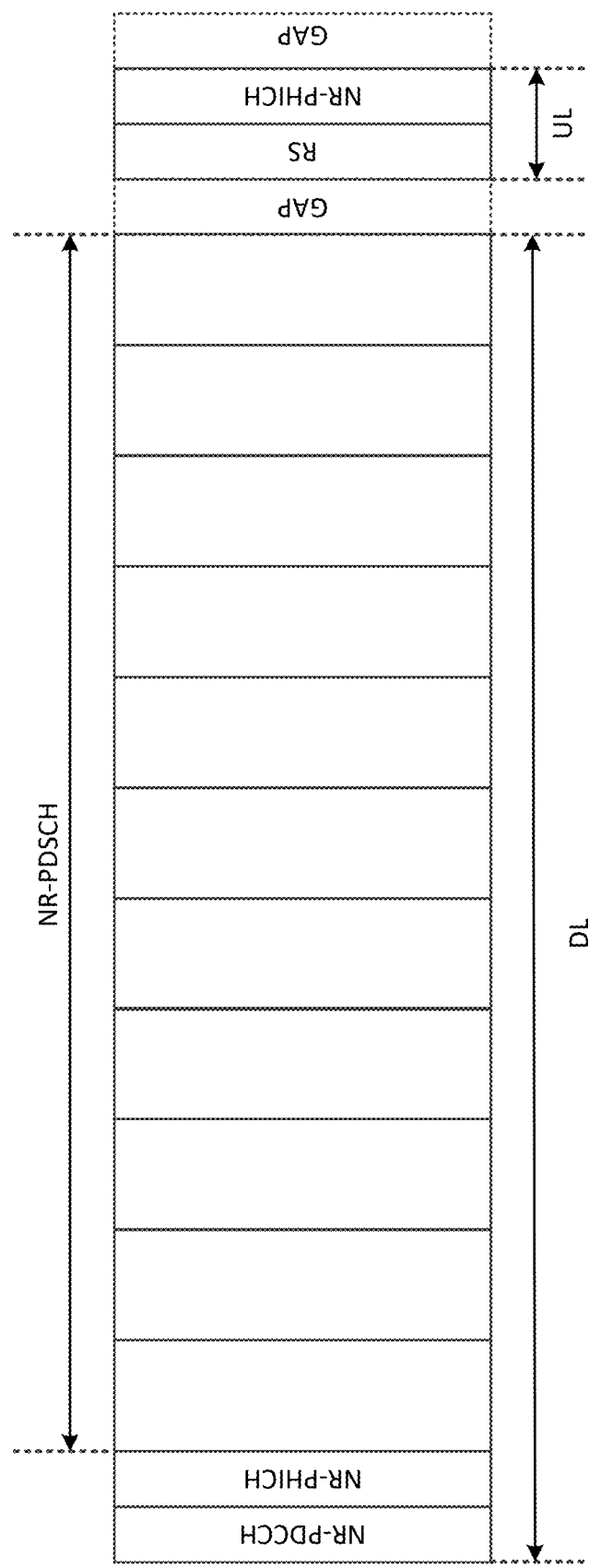
FIG. 5 is a diagram illustrating a first example of a self-contained subframe with mixed numerology for data and control channels.

Control channels may be transmitted with scalable and/or mixed numerology. For example, a NR-PHICH and/or NR-PDCCH carrying control information may be transmitted with a different numerology than a NR-PDSCH or NR-PUSCH carrying data. FIG. 5 may illustrate an example self-contained subframe with mixed numerology for data and control channels. In this example, the NR-PHICH and NR-PDCCH may be transmitted with a half symbol duration while the NR-PDSCH may be transmitted using a full symbol duration. Subcarrier spacing for NR-PHICH and NR-PDCCH may double that for NR-PDSCH. For example, 30 kHz subcarrier spacing may be used for NR-PHICH and NR-PDCCH. 15 kHz subcarrier spacing may be used for NR-PDSCH. With this approach, data throughput may be increased. For example, as shown in FIG. 5, two additional OFDM symbols within a subframe or a time slot (e.g., within each subframe or time slot) may be used for data transmission (e.g., for transmission of NR-PDSCH) as compared to the example shown in FIG. 3, where a single numerology is used for both data and control channel transmissions.

NR-PHICH and/or NR-PDCCH transmissions carrying control information may be transmitted with different numerologies within a subframe. For example, NR-PHICH transmitted in the DL at the beginning of a subframe may use larger OFDM symbols (e.g., with smaller subcarrier spacing) than other control or data channel transmitted in another part of the subframe. Such an NR-PHICH may carry ACK/NACK corresponding to an NR-PUSCH transmission, for example. A larger cyclic prefix (CP) length may be used to make an NR-PHICH transmission (e.g., such as an NR-PHICH transmission performed at the beginning of a subframe) more robust to interference. The interference may arise, for example due to excessive delay spread beyond the CP length. An NR-PHICH transmitted in the UL at the end of a subframe (e.g., such NR-PHICH may carry ACK/NACK corresponding to an NR-PDSCH transmission) may use smaller OFDM symbols (e.g., with larger subcarrier spacing). Using the approach described herein, WTRU and base station turn-around may be efficient (e.g., for at least low latency applications).

Figure 6:
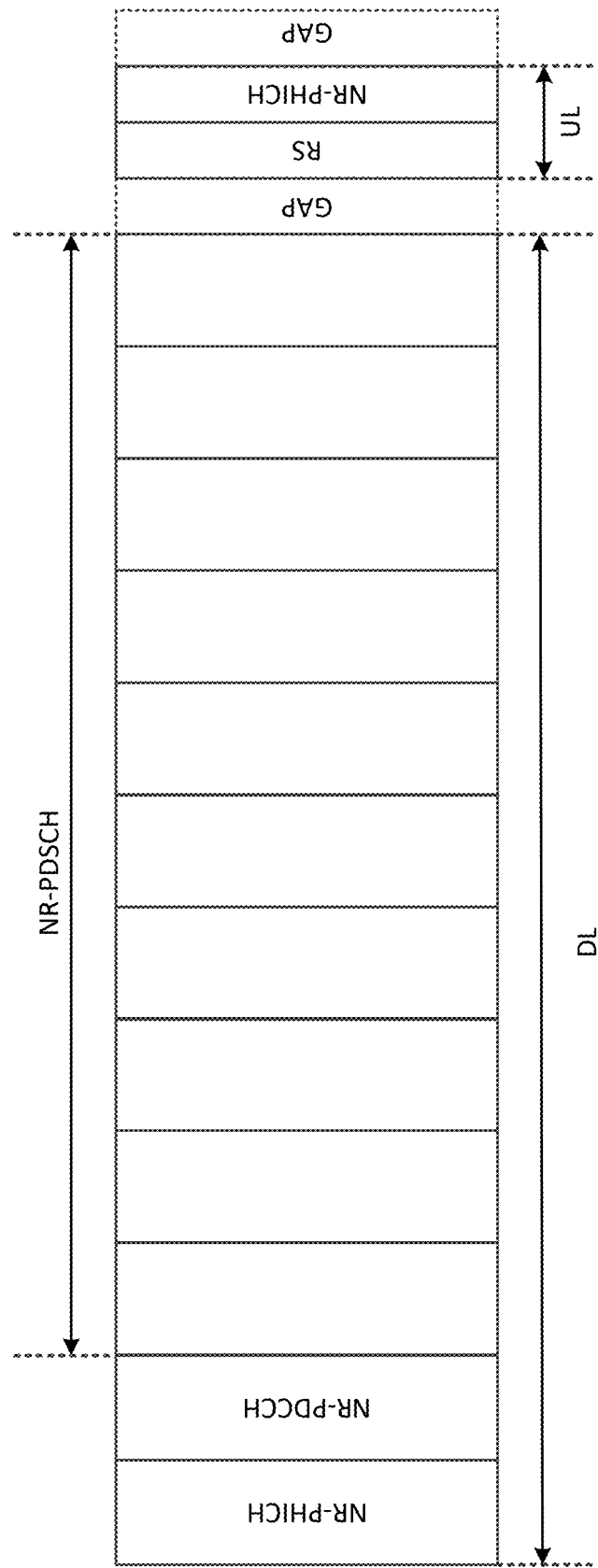
FIG. 6 is a diagram illustrating a second example of a self-contained subframe with mixed numerology for data and control channels.

FIG. 6 shows another example illustrating the concept of using scalable (e.g., flexible) numerology for control channels within a self-contained subframe or time slot. In this example, transmissions conducted in a first part of a subframe may use a different numerology than transmissions conducted in a second part of the subframe. For instance, reference signals and/or control channel transmissions such as an NR-PHICH that are transmitted near the end of a self-contained subframe may use a different numerology (e.g., in terms of symbol duration and/or subcarrier spacing) than an NR-PHICH and/or NR-PDCCH transmitted near the beginning of the subframe.

Figure 7:
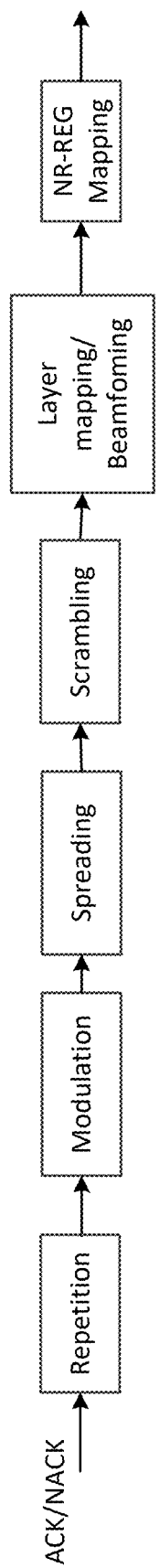
FIG. 7 is a diagram illustrating another example control channel construction process.

A unified control channel (e.g., an NR-PHICH) design may be used for the UL and the DL. An example NR-PHICH construction process may be shown in FIG. 7. The construction may be based on the example process shown in FIG. 2. In either or both of the examples shown in FIGS. 2 and 7, channel coding may be implemented using repetition codes (e.g., for reliability purposes). Other channel codes may also be used.

The reliability of a control channel may be improved via coding, repetition, modulation, and/or the like. Flexible repetition coding techniques may be used to code control information based on one or more characteristics of the control information. Such characteristics may include, for example, a usage scenario (e.g., URLLC, eMBB or mMTC), a latency requirement, or a payload size associated with the control information. For example, a control information bit (e.g., an ACK/NACK bit) may be repeated by a repetition factor of n, where n may be configurable and/or be determined based on a reliability requirement of the control bit. For example, in usage scenarios where higher reliability is desired (e.g., URLLC applications), a higher repetition factor may be configured for both DL and UL. The repetition factors used for DL and UL may be the same or may be different. The repetition factors may be configured independently (e.g., separately), for example based on respective Maximum Coupling Loss (MCL) associated with the DL or UL link.

A bit sequence may be modulated. The modulation may be performed after repetition, for example. The modulation may be performed using BPSK or another suitable modulation technique. In an example case where more than one control information bit is to be transmitted (e.g., two ACK/NACK bits corresponding to two transport blocks or two control bits corresponding to four beams), the control information bits may be modulated (e.g., using QPSK) and then repeated. The order of certain functional blocks in a transmission chain (e.g., the repetition and modulation blocks shown in FIG. 7) may be modified. For instance, when there are two control bits corresponding to four beams, the respective positions of the repetition block and the modulation block shown in FIG. 7 may be switched.

Multiplexing of data and/or control information may be performed (e.g., at a WTRU) by spreading. For example, after repetition and modulation, modulated symbols may be spread using an orthogonal code of size m. The spreading may enable control signals (e.g., ACK/NACK) for multiple WTRUs to be multiplexed (e.g., to improve resource utilization). Parameters associated with spreading (e.g., the size m of an orthogonal code) may determine the maximum capacity of a control channel (e.g., an NR-PHICH) in the system. These parameters may be configured based on one or more characteristics of the transmission such as a usage scenario (e.g., URLLC, eMBB or mMTC), a payload size, and/or a latency requirement associated with the transmission. For example, in usage scenarios where many users may be expected (e.g., mMTC applications), the spreading code length may be increased, for example to enable multiplexing of transmissions by the large number of users who may be sharing time-frequency resources.

A spreading sequence may be real or complex. For example, a complex spreading sequence may be used for BPSK modulated control bits (e.g., ACK/NACK bits). In such examples, the number of user transmissions that may be multiplexed on shared time-frequency resources may be increased (e.g., doubled) since the user transmissions may be multiplexed on both in-phase and quadrature components. For certain usage scenarios (e.g., mMTC applications), the number of transport blocks assigned to the DL and/or the UL may be limited to one. BPSK modulation with complex spreading may be used in these scenarios to increase the user multiplexing capacity of a control channel (e.g., a NR-PHICH).

The functionality of repetition, modulation, and/or spreading may be merged (e.g., into one functional block by utilizing a complementary pair of spreading sequences). For a WTRU, a first spreading sequence may be used to signal ACK and a second (e.g., another) spreading sequence may be used to signal NACK. The length of a spreading sequence associated with a transmission may configurable, e.g., based on the usage scenario and/or other characteristics of the transmission. For example, the length of a spreading sequence may be determined according to requirements associated with reliability and/or with user multiplexing capacity. A larger sequence length may lead to processing gain and/or higher user multiplexing capacity. An example of complementary sequences may be the Golay sequences, the use of which may lower computational complexities. By utilizing the Golay sequences, two complementary spreading sequences may be detected by utilizing one (e.g., only one) correlator at a receiver. In an example, two complementary maximum length sequences (m-sequences) may be applied to signal ACK and NACK, respectively.

It should be noted that complementary sequences may serve multiple purposes. For example, complementary spreading sequences may be used for channel estimation at a receiver (e.g., the sequences may implicitly act as reference symbols in addition to carrying ACK/NACK information). This approach may reduce reference signal overhead and/or increase transmission throughput.

Figure 8:
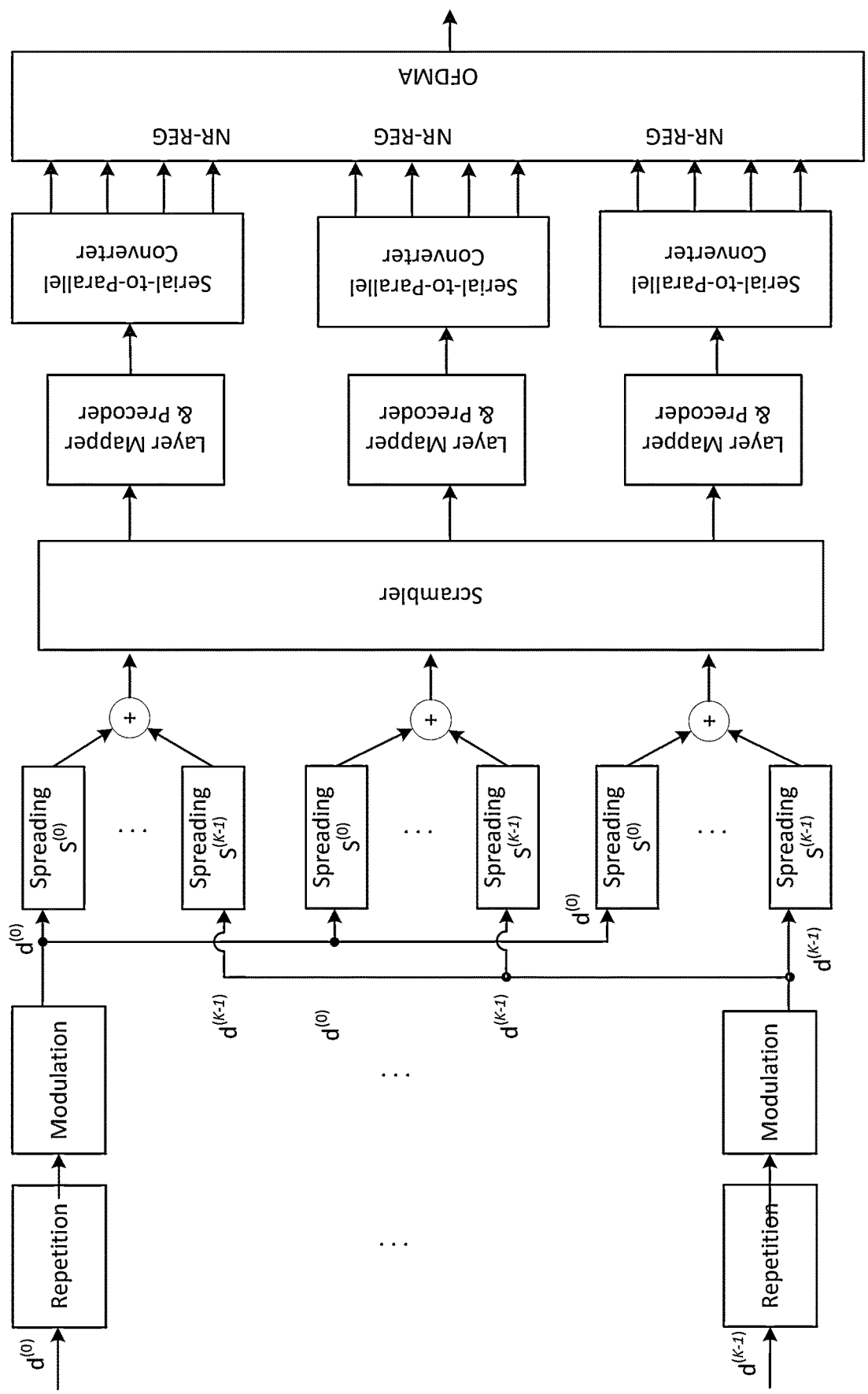
FIG. 8 is a diagram illustrating example control signal superposition and post-processing operations.

Control signals (e.g., ACK/NACK signals) from multiple users may be superimposed (e.g., at a base station and/or for DL transmissions), and sent for post-processing. The post-processing may include scrambling, layer mapping, precoding, and/or beamforming on the superimposed (e.g., combined) signal. FIG. 8 shows an example of control signal superposition and post-processing. The superposition of K ACK/NACK signals using K orthogonal sequences $s^{(k)}$ may result in the following:

$$c = \sum_{k=0}^{K-1} s^{(k)} d^{(k)} \qquad \text{Eq. (1)}$$

where c may be a (L×1) composite signal vector to be mapped on one or more (e.g., three) resource element groups (REGs). $d^{(k)}$ may denote the BPSK-modulated HARQ ACK/NACK symbol for the kth user.

For a system with a repetition factor of n and a spreading factor of length m, the total length L of a composite signal vector may be L=m×n. Equation (1) may be rewritten in a matrix-vector form as $$c = Sd \qquad \text{Eq. (2)}$$

where $S=[s^{(0)}, s^{(1)}, \ldots, s^{(K-1)}]$ may be a (L×K) spreading matrix. $d=[d^{(0)}, d^{(1)}, \ldots, d^{(K-1)}]^T$ may denote the vector containing the K ACK/NACK symbols multiplexed on shared time-frequency resources.

In DL, after forming a composite signal c, n instances of the signal c may be concatenated and scrambled, for example, with a cell-specific or beam-specific scrambling sequence, and/or along with layer mapping and precoding before the instances are mapped to n NR-REGs.

A flexible resource element group design may be applied to a control channel. A NR-REG (e.g., each NR-REG) may be formed by m contiguous resource elements (REs) of an OFDM symbol. A NR-REG may be formed by m non-contiguous REs of an OFDM symbol. Parameters associated with NR-REGs such as the length of a NR-REG and the number of NR-REGs per subframe or time slot may be configurable. The configuration may be set, for example, according to the intended application purpose (e.g., eMBB, URLLC, and/or mMTC). NR-REGs may be spread across allocated bandwidth for a control channel transmission (e.g., such as an NR-PHICH transmissions). Frequency diversity gain may be captured using this approach. The allocated bandwidth for the control channel (e.g., such as an NR-PHICH) may be the entire transmission bandwidth or a subset of the transmission bandwidth.

The number of OFDM symbols used for NR-PHICH transmission in a subframe may be configurable, e.g., based on usage scenarios (e.g., eMBB, URLLC, mMTC, etc.). NR-REGs may be mapped across frequency and/or time domain on multiple resource blocks (RBs), multiple OFDM symbols, and/or multiple beams.

Figure 9:
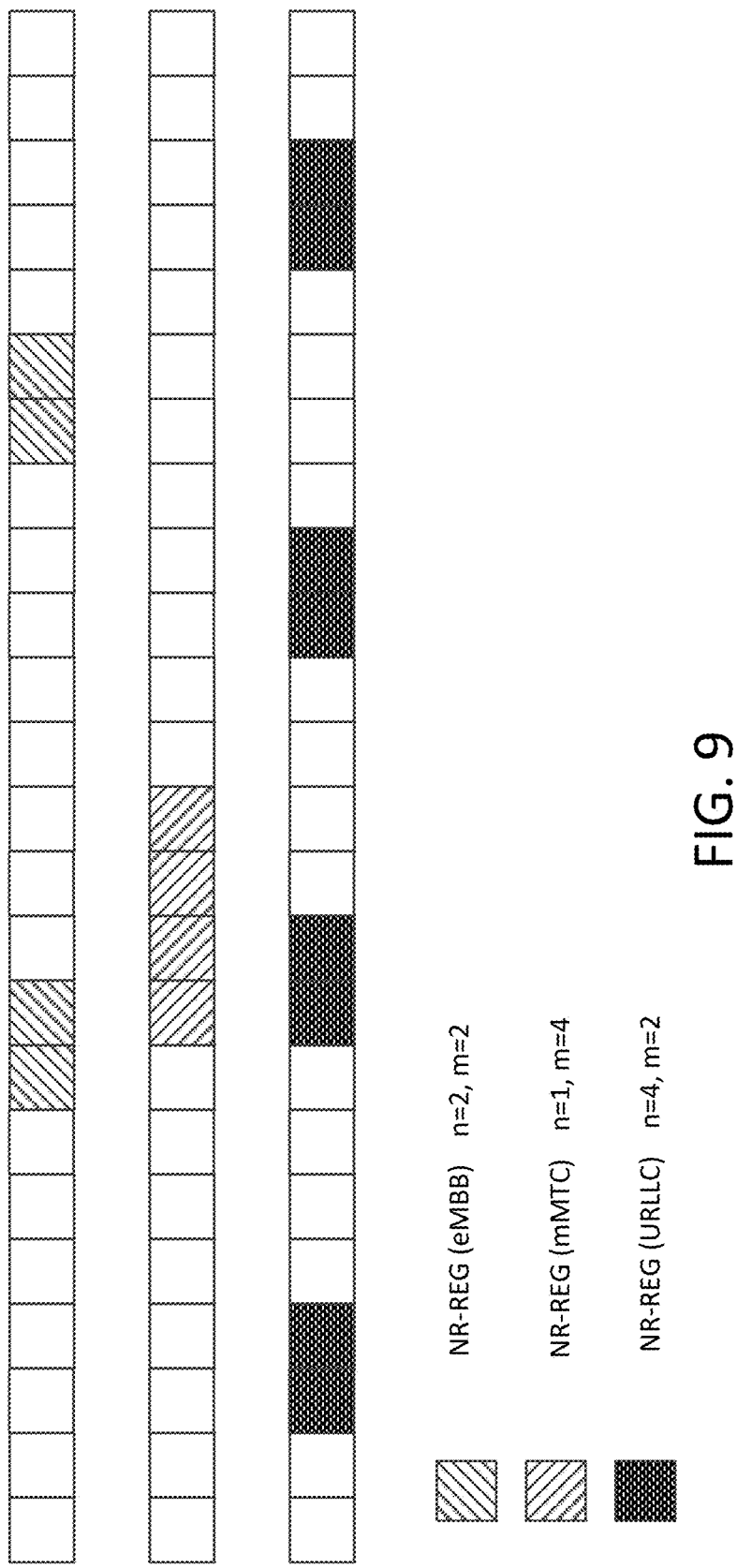
FIG. 9 is a diagram illustrating an example of a flexible new radio resource element group design comprising 2 resource blocks.

FIG. 9 shows an example of a flexible NR-REG design for various usage scenarios. A NR-REG including two resource blocks are shown in the example, with 12 subcarriers per resource block. As shown, for eMBB applications, both repetition factor (e.g., denoted as n) and spreading factor (e.g., denoted as m) may be equal to two. For mMTC applications (e.g., which may have a design target of achieving higher user multiplexing capacity), the repetition factor may be one (e.g., n=1) and the spreading factor may be equal to four (e.g., m=4). This may imply that when a complex spreading sequence is applied in the given example, up to eight users may be multiplexed on the same four REs (e.g., which may double that for the eMBB applications shown in the example). For URLLC applications (e.g., which may have a design target of higher reliability), the repetition factor may be increased to four (e.g., for robustness purposes), which may result in four instances of the orthogonal code being transmitted for each ACK or NACK. The spreading factor for the URLLC applications may be kept at two to reduce inter-user interference that may be caused, for example by code multiplexing. A larger spreading factor may result in higher inter-user interference and lower reliability.

Figure 10:
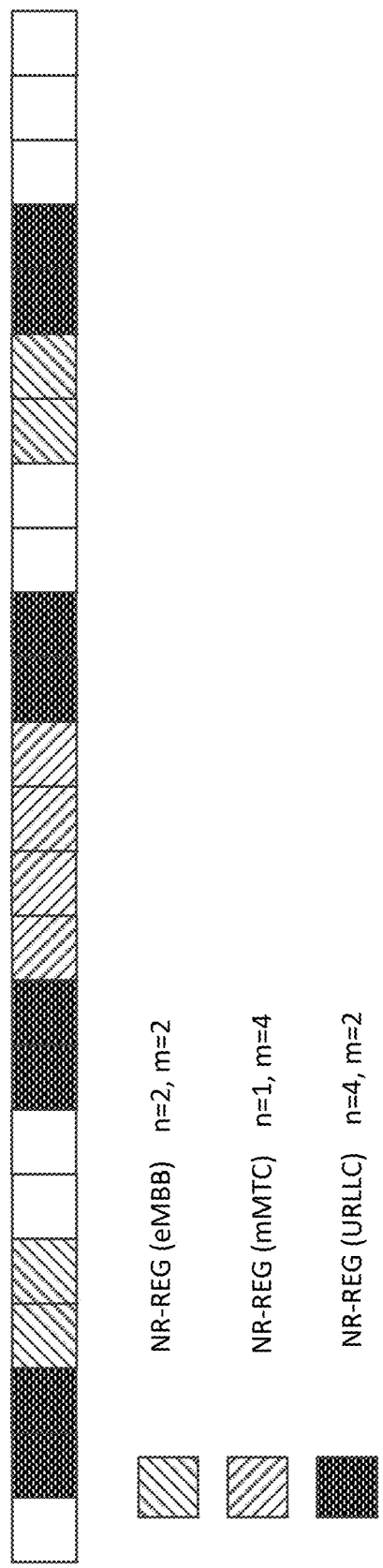
FIG. 10 is a diagram illustrating an example of multiplexing control information.

NR-REGs dedicated for control information transmission may be multiplexed on the same or different frequency subband(s), on the same or different OFDM symbol(s), on the same or different resource blocks, and/or on the same or different beams. FIG. 10 shows an example of multiplexing control information (e.g., such as HARQ ACK/NACK for various applications) on the same subband and on one OFDM symbol. As shown, control information associated with eMBB, mMTC and URLLC applications may be transmitted using different repetition factors (e.g., denoted as n) and/or different spreading factors (e.g., denoted as m). The OFDM symbol may include a plurality of subcarriers (e.g., 24 subcarriers), and the control information for the various applications may be mapped to different subcarriers of the OFDM symbol. The mapping may be performed based on (e.g., as a function of) the respective repetition factors and/or spreading factors associated with the different control information. For example, a first NR-REG may be defined using a repetition factor of 4 and a spread sequence length of 1, while a second NR-REG may be defined using a repetition factor of 1 and a spreading sequence length of 4. Using this example approach, the utilization efficiency of the resources dedicated for control information transmission may be improved.

Figure 11:
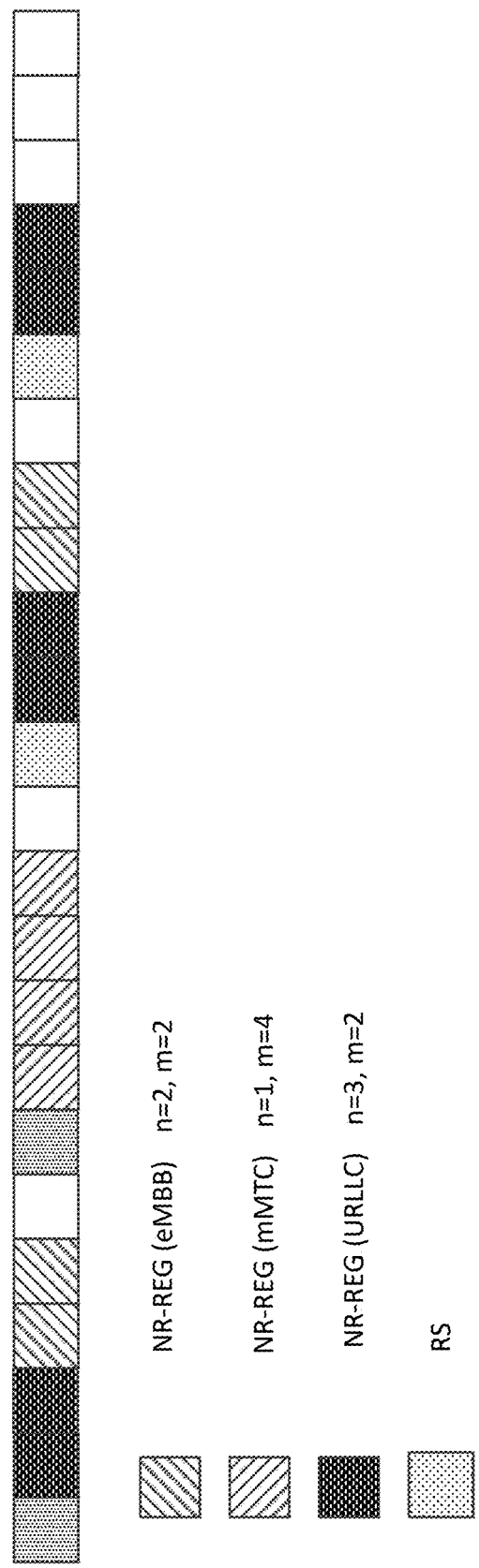
FIG. 11 is a diagram illustrating an example of control channel and resource symbol multiplexing over two resource blocks in the frequency domain.

NR-REGs may be multiplexed with reference symbols in the frequency domain and/or in the time domain. FIG. 11 shows an example of control channel and reference symbol multiplexing over 2 resource blocks in the frequency domain. Note that in this example, two resource elements are dedicated to reference symbols per resource block. In other implementations, a different number of resource elements may be dedicated to reference symbols.

The example in FIG. 11 shows that control information associated with eMBB, mMTC or URLLC applications may be transmitted using different repetition factors (e.g., denoted as n) and/or different spreading factors (e.g., denoted as m). The various control information may be multiplexed (e.g., on one OFDM symbol and/or mapped to different subcarriers of the OFDM symbol). Resource elements used to transmit the various control information may be located at different distances (e.g., in time and/or frequency domains) from resource elements used to transmit reference signals. For example, compared to resource elements used to transmit eMBB or mMTC control information, resource elements used to transmit URLLC control information may be located closer to those used to transmit reference signals. Using this approach, transmission reliability may be improved for URLLC applications (e.g., since better channel estimation may be obtained by transmitting the URLLC control information close to the reference signals).

A unified control channel design may be applied to beam-based transmissions. In a beam-based transmission, control and/or data transmission between a transmission/reception point (TRP) and a WTRU may be performed using one pair of transmit/receive (e.g., a Tx-Rx pair) beams or using multiple pairs of transmit/receive beams (e.g., as opposed to being broadcast within a cell). Transmissions and receptions using a single pair of beams may be referred to herein as single-beam transmissions/receptions. Transmissions and receptions using multiple pairs of beams may be referred to herein as multi-beam transmissions/receptions. Assuming a single beam is used at the transmitter and the receiver, the Tx-Rx pair may be the same for uplink and downlink transmissions (e.g., at least in the case where transmission channels may be reciprocal). If the transmission channels are not reciprocal (e.g., in FDD or non-reciprocal TDD), different Tx-Rx pairs may be used for the uplink versus the downlink.

A NR control channel may be designed to support one or more cases (e.g., all cases) of single-beam and multi-beam transmissions/receptions. The NR control channel may also support the case where one or multiple transmit beams may be used at the transmitter and an omni receiver beam may be used at the receiver.

Control channel parameters may be defined based on the Tx-Rx beamforming mode associated with a transmission and reception (e.g., in addition to the repetition factor and spreading factor based approach described herein). An example beamforming-based control channel design may be illustrated as follows.

$$C \sim (b1, b2, m, n, p)$$

where C may represent a control channel design or configuration, and where m, n, p may respectively represent the spreading factor, the repetition factor, and the beamforming mode used in the transmission and reception.

The beamforming mode may include the case of a single pair of transmit/receive beams. The beamforming mode may include the case of multiple pairs of transmit/receive beams (e.g., which may possibly also indicate the specific combination of transmit beams and receive beams used in the transmission/reception). The beamforming mode may include the case of semi-beam-based communications (e.g., where one or multiple transmit beams may be used along with an omni receive beam). For example, assuming that p=1 indicates a single pair of transmit and receive beams, then C may be determined based on one or more of (b1, b2, m, n, 1), where b1 and b2 may indicate the indices of the respective transmit and receive beams. In such an example, the values of b1 and b2 may be different for different beam pairs. The values of b1 and b2 may be different for uplink versus downlink transmissions (e.g., at least in the case of non-reciprocal channels/beams).

For other values of p (e.g., multi-beam transmissions/receptions), the combination of b1 and b2 may indicate a specific set of transmit and receive beams used, e.g., based on a table. The values of p, b1, and b2 for each link may be set statically, semi-statically or dynamically. In the static case, the values of p, b1, and b2 may be identified by the transmitting device (e.g., a WTRU or TRP), for example from a pre-selected set of values based on measurement of channel metrics (e.g., during a beam-discovery and/or beam-pairing procedure).

In the semi-static case, the values of b1, b2, and p may be set by higher layer signaling. In the dynamic case, the values of b1, b2, and p may be identified by the transmitting device (e.g., a WTRU or TRP), for example based on channel metrics derived during transmission. These channel metrics may be derived based on beam reference symbols and/or the quality of the control channel received, for example. The quality of the control channel received may be derived implicitly (e.g., based on the success or failure of a control channel reception) or explicitly (e.g., based on feedback from the receiver regarding the quality of the channel).

For low latency URLLC, control channel parameters may be determined based on (e.g., linked to) the beam pair used. For example, low latency transmissions may not wait for an optimal Tx-Rx beam pair and as such, may change the coding factor (e.g., repetition factor) and/or the number of multiplexed control channels depending on the beam pair used. In an example, if a non-optimal beam pair is used, the repetition factor may be increased and the number of user transmissions to be multiplexed may be reduced.

In examples, a transmit beam (Tx beam) associated with downlink control channel transmissions may be wider than a transmit beam associated with downlink data channel transmissions. In examples, beams and control parameters used in the transmission of uplink and downlink data or control information may or may not be reciprocal to each other (e.g., a downlink data channel transmit beam may be used as the receive beam (Rx beam) of uplink control channel transmissions).

Beams used for control channel in beam-based transmissions may be announced. A TRP and/or WTRU may perform a beam discovery procedure and find a set of transmit-receive (Tx-Rx) beam pairs. For example, if the TRP transmits with a beam combination in downlink transmissions, the WTRU may determine a suitable receive beam combination (e.g., which may include an omni beam). In some cases, the suitable receive beam may be a null beam, which may imply that the WTRU may be unreachable on that beam.

In certain usage scenarios (e.g., to reduce latency in transmissions while maintaining performance), a TRP may announce the beam combination it intends to use for transmission at a future time (e.g., after a certain number of time instances from the announcement). The announcement may enable the WTRUs that may be interested in receiving the transmission to set up a suitable beam combination for the reception. The announcement may facilitate the sending of a grant request by one or more of the WTRUs at an appropriate time. The announcement may enable one or more of the WTRUs to receive control/data information from the TRP.

A TRP may use a large beamwidth for its control channel. The TRP may announce the index or indices of the sub-beam(s) that the TRP may use (e.g., after a number of time intervals and/or for a certain time duration). The time interval between the announcement frame and the start of the beam indices may be set statically (e.g., based on pre-configured values), semi-statically (e.g., using a combination of pre-configuration and signaling) or dynamically (e.g., via higher layer signaling).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU), the method comprising:
  receiving a downlink control transmission using a first subcarrier spacing in a subframe;
  receiving a downlink data transmission using a second subcarrier spacing the subframe, wherein the second subcarrier spacing is different from the first subcarrier spacing; and
  transmitting a first uplink transmission using the first subcarrier spacing or the second subcarrier spacing, wherein the first uplink transmission comprises a bit indicating hybrid automatic repeat request (HARQ) negative acknowledgment (NACK) feedback for the downlink data transmission, and wherein the bit is repeated a configured number of times in the first uplink control transmission.

2. The method of claim 1, wherein the first subcarrier spacing being different from the first subcarrier spacing comprises the first subcarrier spacing being twice of the second subcarrier spacing.

3. The method of claim 1, wherein the configured number of times corresponds to a configured repetition factor.

4. The method of claim 3, wherein the configured repetition factor is four.

5. The method of claim 3, wherein the configured repetition factor is one.

6. The method of claim 3, wherein the method further comprises a second uplink control transmission comprising a second bit, the second uplink control transmission being repeated a different number of times.

7. The method of claim 1, wherein the downlink control transmission is received in a first symbol duration associated with the first subcarrier spacing, the downlink data transmission is received in a second symbol duration associated with the second subcarrier spacing, and the first symbol duration is twice of the second symbol duration.

8. The method of claim 1, wherein the first subcarrier spacing is used for transmitting the first uplink control transmission.

9. The method of claim 1, wherein the second subcarrier spacing is used for transmitting the first uplink control transmission.

10. A wireless transmit/receive unit receiver, a processor and memory, the WTRU configured to:
   receive a downlink control transmission using a first subcarrier spacing in a subframe;
   receive a downlink data transmission using a second subcarrier spacing in the subframe, wherein the second subcarrier spacing is different from the first subcarrier spacing; and
   transmit a first uplink control transmission using the first subcarrier spacing or the second subcarrier spacing, wherein the first uplink control transmission comprises a bit indicating hybrid automatic repeat request (HARQ) negative acknowledgement (NACK) feedback for the downlink data transmission, and wherein the bit is repeated a configured number of times in the first uplink control transmission.

11. The WTRU of claim 10, wherein the second subcarrier spacing being different from the first subcarrier spacing comprises the first subcarrier spacing being twice of the second subcarrier spacing.

12. The WTRU of claim 10, wherein the configured number of times corresponds to a configured repetition factor.

13. The WTRU of claim 12, wherein the configured repetition factor is four.

14. The WTRU of claim 12, wherein the configured repetition factor is one.

15. The WTRU of claim 12, wherein the WTRU further comprises a second uplink control transmission comprising a second bit, the second uplink control transmission being repeated a different number of times.

16. The WTRU of claim 10, wherein the WTRU is further configured to:
   receive the downlink control transmission in a first symbol duration associated with the first subcarrier spacing, and
   receive the downlink data transmission in a second symbol duration associated with the second subcarrier spacing,
   wherein the first symbol duration is twice of the second symbol duration.

17. The WTRU of claim 10, wherein the WTRU is further configured to transmit the uplink control transmission in the subframe.

18. The WTRU of claim 10, wherein the first subcarrier spacing is used for transmitting the first uplink control transmission.

19. The WTRU of claim 10, wherein the second subcarrier spacing is used for transmitting the first uplink control transmission.

20. A base station for wireless communications, comprising circuitry, including a transmitter, a receiver, a processor and memory, the base station configured to:
   transmit a downlink control transmission using a first subcarrier spacing in a subframe;
   transmit a downlink data transmission using a second subcarrier spacing in the subframe, wherein the second subcarrier spacing is different from the first subcarrier spacing; and
   receive a first uplink control transmission using the first subcarrier spacing or the second subcarrier spacing, wherein the first uplink control transmission comprises a bit indicating hybrid automatic repeat request (HARQ) negative acknowledgement (NACK) feedback for the downlink data transmission, and wherein the bit is repeated a configured number of times in the first uplink control transmission.

* * * * *